UNITED STATES PATENT OFFICE.

CHARLES J. EAMES, OF NEW YORK, N. Y.

PROCESS OF REDUCING IRON ORE.

SPECIFICATION forming part of Letters Patent No. 432,383, dated July 15, 1890.

Application filed October 30, 1889. Serial No. 328,691. (No specimens.)

*To all whom it may concern:*

Be it known that I, CHARLES J. EAMES, a citizen of the United States, residing at New York city, in the State of New York, have invented certain new and useful Improvements in the Process of Reducing Iron Ore; and I hereby declare the following to be a full, clear, and exact description of the same, such as will enable others skilled in the art to apply the invention.

My present invention relates to what is commonly called the "direct process" for the manufacture of iron and steel, or that class wherein deoxidation is effected or a sponge is first produced by subjecting mixtures of ore and carbon, either with or without other agents, to a reducing or cherry-red heat in hearths, reverberatory furnaces, or like deoxidizing-chambers, the sponge so produced being subsequently balled up and either hammered into blooms or taken to the open hearth. Heretofore the ore and reducing agent have commonly been reduced to nut size before mixing and subjecting to the reducing-heat; but sometimes, though less commonly, the ore and reducing agent have been reduced to a granular condition before mixing. The result, however, of the above methods has not been very satisfactory, because of the great waste of the reducing agent and the tendency of the mixture to form semi-fused masses of partially-deoxidized ore productive of still further loss in the subsequent treatment of the mass to obtain iron or steel.

In Letters Patent No. 404,184, granted to me May 28, 1889, I have described and claimed a process of reducing ore, which consists in subjecting a moist or plastic mass of admixed pulverized iron ore and a reducing agent to a reducing-heat in a suitable furnace, and have also described and claimed methods of preserving the porosity or spongy condition of the mass throughout the process. The aforesaid process, while very efficient and an advance on previous methods, has been found in practice to be capable of still further improvement.

In practice I have found that when the charge of iron and carbon are wet like paste, if the moisture is rapidly driven off the charge may become too compact and require a higher heat and a somewhat longer time for the heat to penetrate the mass. I have also found that the finer the material is ground, short of impalpability or a condition which would render the subsequent admixing of the powder troublesome, the more rapid and perfect the deoxidation of the ore and the less will be the loss of iron in the subsequent treatment; and, further, that a mechanical method of preserving the porosity of the stratum under treatment is preferable to that in which substances volatilizing at different temperatures are employed.

My present invention therefore embraces, first, the grinding of both the ore and the carbon or reducing agent to an exceedingly fine powder and a thorough admixture of said powders and fine sawdust from either hard or soft wood, and, second, the addition to a mixture of finely-pulverized ore, carbon, or other reducing agent and fine sawdust of black oxide of manganese, either one of said mixtures being subsequently subjected to a reducing-heat in a suitable furnace.

I will now proceed to describe my invention more specifically.

In carrying out my invention I use for the reducing agent any suitable form of carbon—as, for instance, graphitic carbon, such as is found at Cranston, Rhode Island, and elsewhere, coke, hard and soft coal, petroleum coke or residuum, charcoal, &c.—which I grind to a very fine powder, though not to an impalpable powder. The ore, likewise, is ground to an exceedingly-fine powder, less than impalpability, and the ore and the reducing agent in the condition above stated are then intimately mixed in the proportions of about thirty per cent. to forty per cent. of carbon to the charge. I then add to the mixture above specified about ten per cent. of fine wood sawdust from either hard or soft wood, and as a still further step, in order to facilitate the absorption of carbon by the iron, I prefer to add from one per cent. to two per cent. of black oxide of manganese. It is to be understood, however, that the latter-named ingredients may be omitted at will. When the sawdust and black oxide of manganese are used, I prefer to first mix the two, dampening them to cause the manganese to adhere to or cover the sawdust particles, and then add them to the mixture of finely-pulverized ore and carbon in about the proportions hereinbefore specified.

Difficulty may be experienced in preparing the several ingredients or of mixing them without loss, owing to their finely divided or powdered condition, and therefore I recommend that they be slightly dampened with water, either before or after grinding, care being had to use only enough water to lay the dust and to avoid the formation of a paste or plastic mass.

The admixture of ore and reducing agent having been made as hereinbefore specified, a charge is introduced into a suitable furnace in form of a layer or stratum and subjected to a proper reducing-heat, substantially as pointed out in my former patents. The bottom of the furnace may have the ordinary sand bottom, a coke bottom, or a graphitic carbon bottom, as preferred.

The object of the sawdust, which may be from either hard or soft wood, is to keep the mass of the charge porous. The sawdust also becomes converted into charcoal throughout the charge for the reason that no oxygen attacks it until dissociation of oxygen from the ore occurs. Thereafter it assists in the more rapid reduction of the ore. The oxide of manganese facilitates the absorption of the carbon by the iron, and it also prevents the rapid combustion of the sawdust after it has been converted into charcoal.

When a charge of iron ore is so fine, as herein set forth, a very thin stratum or charge is necessary from the dense nature of the material; but when sawdust is used in about the proportions stated a much thicker charge can be worked in a much less time.

Having thus described my invention, what I claim, and desire to secure by Letters Patent, is—

1. As an improvement in the art of reducing ore, subjecting a dry mass or charge of finely-divided and intimately-admixed iron ore, reducing agent, and sawdust to a reducing-heat in a reverberatory or other suitable furnace, substantially as and for the purpose specified.

2. As an improvement in the art of reducing ore, subjecting a dry mass of finely-divided and intimately-mixed iron ore, reducing agent, sawdust, and oxide of manganese to a reducing-heat in a reverberatory or other suitable furnace, substantially as and for the purpose specified.

In testimony whereof I affix my signature, in presence of two witnesses, this 29th day of October, 1889.

CHARLES J. EAMES.

Witnesses:
    WM. A. EASTERDAY,
    F. W. RITTER, Jr.